(Model.)

W. P. TRACY.
NUT LOCK.

No. 280,690. Patented July 3, 1883.

Attest:
Walter Donaldson
F. L. Middleton

Inventor
William P. Tracy
by Ellis Spear
Atty.

UNITED STATES PATENT OFFICE.

WILLIAM P. TRACY, OF GRAND RAPIDS, MICHIGAN.

NUT-LOCK.

SPECIFICATION forming part of Letters Patent No. 280,690, dated July 3, 1883.

Application filed November 24, 1882. (Model.)

*To all whom it may concern:*

Be it known that I, WILLIAM P. TRACY, of Grand Rapids, in the county of Kent and State of Michigan, have invented a new and useful Improvement in Nut-Locks; and I do hereby declare that the following is a full, clear, and exact description of the same.

My invention relates to nut-locks, and is especially designed for the nuts of the top-props for buggies and other vehicles, but is applicable also for use in other positions. Nuts such as are used to hold in place the top-props of vehicles are specially liable to become unloosed by the jarring to which they are subjected, and are also specially difficult to securely lock. It is also desirable, whenever provision is made for holding a lock in place, that the nut should not be thereby greatly enlarged, nor the finish or appearance of it impaired. I have aimed to provide a securely-locked nut without materially increasing the size of the nut, and without thus impairing the finish and appearance.

Figure 1:
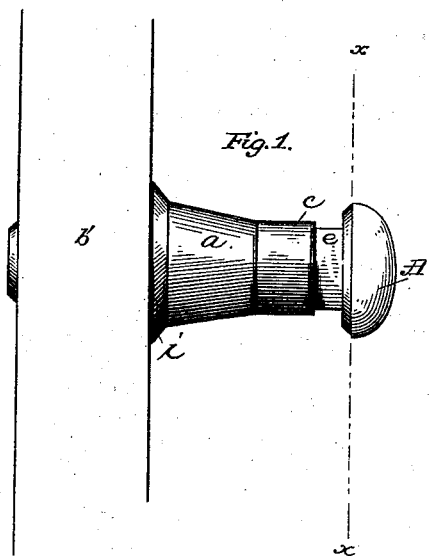
Figure 3:
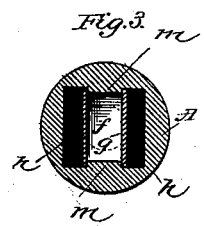
Figure 2:
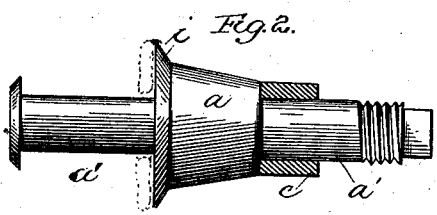
Figure 4:
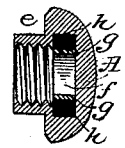

In the accompanying drawings, Figure 1 shows a side elevation of a part of a prop, the stud upon which it is placed, and the self-locking nut. Fig. 2 shows a side elevation of the stud. Fig. 3 shows a section of the nut on line $x\ x$ of Fig. 1. Fig. 4 shows a section of the nut, taken longitudinally through the perforations.

In the drawings, $a$ represents a sleeve, which is mounted upon a pin, $a'$, the latter passing through the bow $b'$ of the carriage-top. The sleeve $a$ is preferably mounted loosely on the pin and bearing against a rubber washer, $i$, also mounted on the pin between the sleeve and the bow $b'$. If desired, however, the sleeve $a$ may be rigidly secured to the pin, or may form an integral part of it. The pin is provided with a suitable head or flange on the inside of the bow, and the sleeve $a$ fits closely against the outside of such bow, as shown in Fig. 1. The carriage-prop is represented at $c$, and is provided with an eye, by which it is allowed a slight movement upon the pin outside the sleeve $a$, where it is held between such sleeve and the nut A, which will now be described. The pin is threaded in the ordinary manner, except that at the extreme end it is made polygonal in form. As shown, it is square; but it may be made of other polygonal forms, and is reduced in size, so as to be of less diameter than the threaded portion.

The nut A has a polygonal part, $e$, which is threaded to fit the threaded part of the stud. Within the rounded boss of the nut, however, is a chambered portion, $f$, in which are placed small metallic plates $g$, having behind them rubber or other suitable springs, $h$, adapted to push the plates forward into contact with the sides of the end of the pin. The springs are such as to push the plates forward and to press against opposite flattened sides of the pin, so as to hold the nut from turning with sufficient force, but at the same time to yield enough when force is applied to the nut to allow the corners of the pin to press the plates back and the nut to turn upon the stud. The upper and lower walls of the chamber, as shown in Fig. 3, are provided with projections or shoulders $m$, of slightly less width than the end of the rectangular pin $a'$. The purpose of these shoulders is to keep the plates $g$ in an upright position, so that the end of the pin can be more easily inserted. Without them the springs might push the plates inward, so one or both of them would lie diagonally, making it difficult to introduce the end of the pin into the chamber.

I do not confine myself to the special form of nut shown, nor to the number of spring-plates, it being only essential that there should be a spring within the cavity of the nut adapted to bear against the plane face of the end of the pin; and it is obvious that one or more plane faces may be provided upon the end of the pin, and one or more springs used in the cavity.

It will be observed that the nut will be held securely as soon as the polygonal end thereof has passed into the chamber, so as to bear against the spring-plate or receive the pressure of the spring, and it is not necessary that the nut should be turned up to bear against the eye of the prop, or any equivalent part against which it may be brought. It leaves the prop or like part free to turn. Manifestly, the pin in this case represents any ordinary bolt to which the device may be applied.

Having thus described my invention, what I claim is—

1. In a nut-lock for carriage-tops, the combination of the pin passing through the bow and having the rectangular outer end, the sleeve $a$, mounted thereon, the prop $c$, and the chambered nut having internal springs adapted to be applied to the end of the pin and to hold the said nut in place, substantially as described.

2. The combination, with the carriage bow and prop, of the pin $a'$, having the sleeve $a$ and rectangular end, and the nut $A$, adapted to be screwed upon such pin, and having the chamber $f$ to receive the rectangular end of the same, and also having internal springs adapted to be operated without external means of control, substantially as described.

In testimony whereof I have signed my name to this specification in the presence of two subscribing witnesses.

WILLIAM P. TRACY.

Witnesses:
 HENRY B. GRADY,
 THOS. J. JENNESS.